US012531041B2

United States Patent
(12) United States Patent
Ishii et al.

(10) Patent No.: US 12,531,041 B2
(45) Date of Patent: Jan. 20, 2026

(54) REPRODUCTION CONTROL DEVICE, PROGRAM, AND REPRODUCTION CONTROL METHOD

(71) Applicant: AlphaTheta Corporation, Yokohama (JP)

(72) Inventors: Yuuta Ishii, Yokohama (JP); Kanta Koda, Yokohama (JP); Akihide Hasegawa, Yokohama (JP); Minoru Watanabe, Yokohama (JP); Hideki Miyata, Yokohama (JP)

(73) Assignee: ALPHATHETA CORPORATION, Yokohama (JP)

(*) Notice: Subject to any disclaimer, the term of this patent is extended or adjusted under 35 U.S.C. 154(b) by 920 days.

(21) Appl. No.: 17/602,128

(22) PCT Filed: Apr. 8, 2019

(86) PCT No.: PCT/JP2019/015253
§ 371 (c)(1),
(2) Date: Oct. 7, 2021

(87) PCT Pub. No.: WO2020/208668
PCT Pub. Date: Oct. 15, 2020

(65) Prior Publication Data

US 2022/0148546 A1 May 12, 2022

(51) Int. Cl.
*G10H 1/00* (2006.01)
*G10H 1/36* (2006.01)

(52) U.S. Cl.
CPC ........... *G10H 1/0008* (2013.01); *G10H 1/361* (2013.01); *G10H 2210/281* (2013.01); *G10H 2220/011* (2013.01); *G10H 2250/041* (2013.01)

(58) Field of Classification Search
CPC ................ G10H 1/0008; G10H 1/361; G10H 2210/281; G10H 2220/011; G10H 2250/041
See application file for complete search history.

(56) References Cited

U.S. PATENT DOCUMENTS 6,062,867 A * 5/2000 Torimura .............. G09B 15/04 348/589
6,140,565 A * 10/2000 Yamauchi ........... G10H 1/0008 84/622
2019/0005959 A1* 1/2019 Cameron ............. G10L 21/055

FOREIGN PATENT DOCUMENTS

JP 3-239290 10/1991
JP 6-242788 9/1994
(Continued)

OTHER PUBLICATIONS

International Preliminary Report on Patentability dated Sep. 28, 2021, 5 pages.
(Continued)

*Primary Examiner* — Jianchun Qin
(74) *Attorney, Agent, or Firm* — Rankin, Hill & Clark LLP

(57) ABSTRACT

A playing controller includes: a data acquiring unit configured to acquire audio data associated with information regarding a play position in a music piece and text-related data associated with the information regarding the play position; an operation signal acquiring unit configured to acquire an operation signal indicating an operation for a control of the music piece; an audio data processing unit configured to process, in accordance with the operation signal, the audio data associated with a section within the music piece identified by the information regarding the play position; an image data generating unit configured to generate image data containing a character image based on the
(Continued)

text-related data and process the character image showing a lyric in the section based on the information regarding the play position and the operation signal; and a data output unit configured to output the processed audio data and the image data.

13 Claims, 5 Drawing Sheets

(56) References Cited

FOREIGN PATENT DOCUMENTS

| | | |
|---|---|---|
| JP | 2001-154665 | 6/2001 |
| JP | 2004-318162 | 11/2004 |
| JP | 2008-112158 | 5/2008 |
| JP | 2013-218406 | 10/2013 |
| JP | 2016-080908 | 5/2016 |
| WO | 99/12153 | 3/1999 |

OTHER PUBLICATIONS

International Search Report dated Jun. 18, 2019, Application No. PCT/JP2019/015253, English translation included, 4 pages.

* cited by examiner

REPRODUCTION CONTROL DEVICE, PROGRAM, AND REPRODUCTION CONTROL METHOD

TECHNICAL FIELD

The present invention relates to a playing controller, a program, and a playing control method.

BACKGROUND ART

For instance, when a music piece is played by use of a music player or any of a variety of mobile terminals, lyrics of the music piece are typically displayed in synchronization with playing. For instance, Patent Literature 1 describes a technology enabling such display by embedding, in an audio file, a synchronization signal for allowing text to be synchronously outputted during playing of the audio file. Further, Patent Literature 2 describes a synchronous lyrics delivery system that causes no duplicative cost for acquiring music data to be generated in a case where a client has already possessed a music file.

CITATION LIST

Patent Literature(s)

Patent Literature 1: JP 2004-318162 A
Patent Literature 2: JP 2008-112158 A

SUMMARY OF THE INVENTION

Problem(s) to be Solved by the Invention

For instance, in displaying text synchronized with a music piece by a technology as described above, a rendering effect is typically added in the form of, for instance, changing a color of the text showing lyrics with the progression of the music piece, setting color, transparency, in-screen display position of the text in advance, or changing, in response to a change in a play position within the music piece, the text on display to one corresponding to the changed play position.

However, these renderings, which presuppose that a music piece is to be played in a forward direction at a normal speed, are not always sufficient to express, for instance, a real-time feeling of performance, for instance, in a case where an image is displayed while the music piece is played by the performance of a DJ (Disc Jockey) or a VJ (Visual Jockey).

Accordingly, an object of the invention is to provide a playing controller, a program, and a playing control method that enable adding a rendering effect for expressing a real-time feeling of performance in a case where an image is displayed with playing of a music piece.

Means for Solving the Problem(s)

According to an aspect of the invention, a playing controller is provided, the playing controller including: a data acquiring unit configured to acquire audio data associated with information regarding a play position in a music piece and text-related data associated with the information regarding the play position; an operation signal acquiring unit configured to acquire an operation signal indicating an operation for a control of the music piece; an audio data processing unit configured to process, in accordance with the operation signal, the audio data associated with a section within the music piece, the section being identified by the information regarding the play position; an image data generating unit configured to generate image data containing a character image based on the text-related data and process the character image showing a lyric in the section based on the information regarding the play position and the operation signal; and a data output unit configured to output the processed audio data and the image data.

According to another aspect of the invention, a program configured to cause a computer to function as the playing controller is provided.

According to still another aspect of the invention, a playing control method is provided, the method including: acquiring audio data associated with information regarding a play position in a music piece and text-related data associated with the information regarding the play position; acquiring an operation signal indicating an operation for a control of the music piece; processing, in accordance with the operation signal, the audio data associated with a section within the music piece, the section being identified by the information regarding the play position; generating image data containing a character image based on the text-related data and processing the character image showing a lyric in the section based on the information regarding the play position and the operation signal; and outputting the processed audio data and the image data.

BRIEF DESCRIPTION OF DRAWING(S)

DESCRIPTION OF EMBODIMENT(S)

Figure 1:
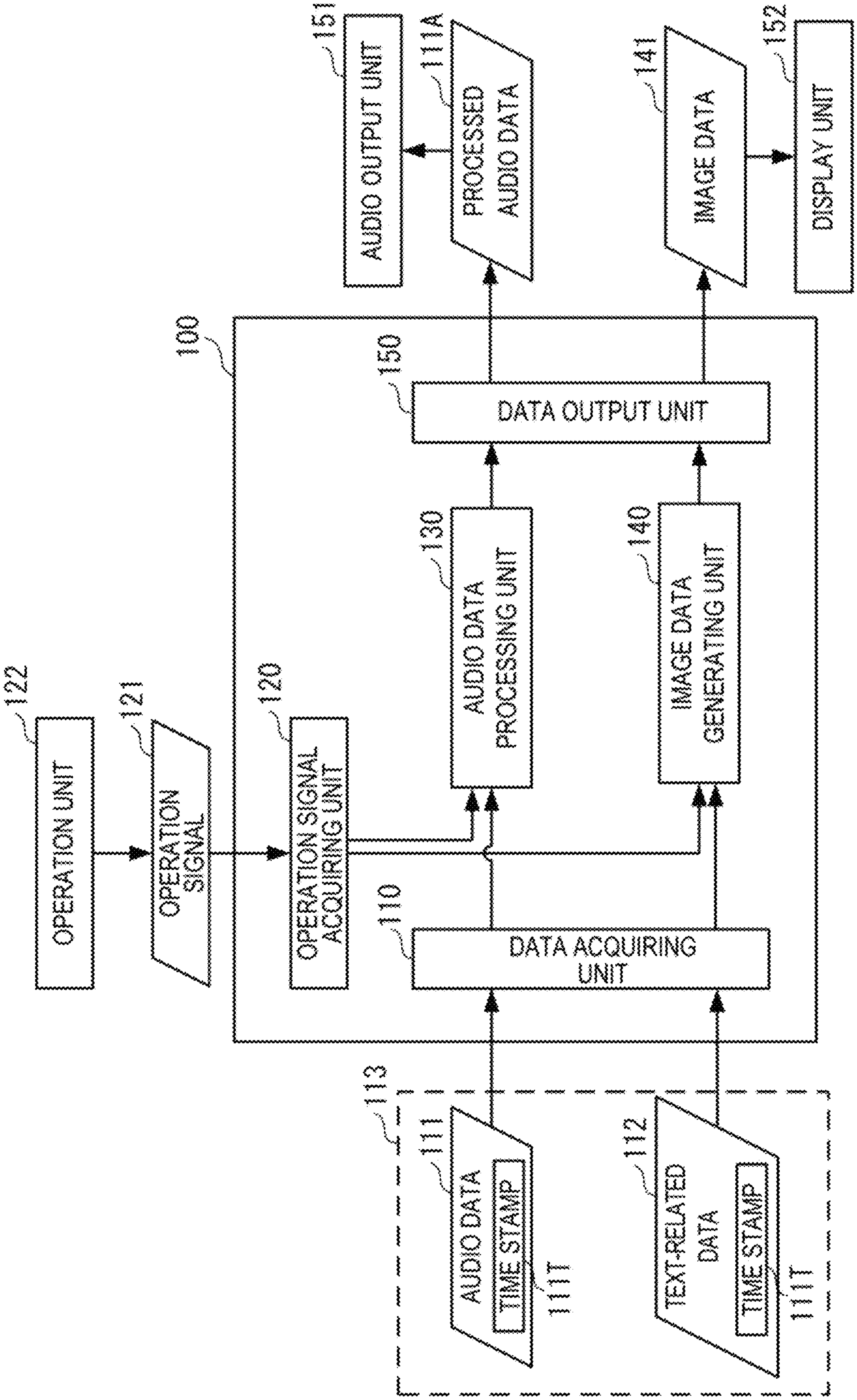
FIG. 1 is a block diagram showing a schematic functional configuration of a playing controller according to an exemplary embodiment of the invention.

A detailed description will be made below on a preferred exemplary embodiment of the invention with reference to the attached drawings. It should be noted that the same reference sign is used to refer to components having substantially the same functional configuration herein and in the drawings and a redundant explanation thereof is omitted accordingly.

FIG. 1 is a block diagram showing a schematic functional configuration of a playing controller according to an exemplary embodiment of the invention. As shown in FIG. 1, a playing controller 100 includes a data acquiring unit 110, an operation signal acquiring unit 120, an audio data processing unit 130, an image data generating unit 140, and a data output unit 150. Functions of the above-described units are implemented by causing, in the playing controller with, for instance, a computer hardware configuration, a processor to operate in accordance with a program. The functions of the units will be further described below.

The data acquiring unit 110 is configured to acquire audio data 111 of a music piece and text-related data 112 for displaying text of lyrics of the music piece. More specifically, the data acquiring unit 110 is configured to read the audio data 111 and the text-related data 112 from a storage 113. The storage 113 may be provided in a device different from the playing controller 100. In this case, the data acquiring unit 110 is configured to receive the audio data 111 and the text-related data 112 through wired or wireless communication. It should be noted that the audio data 111 and the text-related data 112 are not necessarily stored in the same storage 113 but may be stored in respective different storages. For instance, the data acquiring unit 110 may be configured to read the audio data 111 stored in a storage provided in the playing controller 100 and receive the text-related data 112 from an external device.

In the exemplary embodiment, the audio data 111 and the text-related data 112 are associated with a time stamp 111T, which is information regarding a play position in a music piece. By means of the audio data 111 and the text-related data 112 being associated with the common time stamp 111T, the image data generating unit 140 can identify the text-related data 112 corresponding to a specific section within the music piece and generate image data containing a character image showing lyrics of the music piece in the section as described later. The text-related data 112 contains, for instance, text data or image data of text. The text-related data 112 is associated with the time stamp 111T in the music piece, for instance, on a phrase basis or a word basis.

The operation signal acquiring unit 120 is configured to acquire an operation signal 121 indicating an operation for control of a music piece. The operation signal 121 is generated by a user operating a button, a pad, a switch, a knob, a jog wheel, or the like of an operation unit 122 while a music piece and an image are played, for instance, by the data output unit 150 outputting the audio data 111 and image data 141. The operation unit 122 may be provided in a device different from the playing controller 100. In this case, the operation signal acquiring unit 120 is configured to receive the operation signal 121 through wired or wireless communication. In the exemplary embodiment, the operation for control of a music piece includes, for instance, repeatedly playing a specific section within the music piece by a scratch operation on a jog wheel, jump to a Cue point, or the like, applying a filter with a predetermined frequency band, such as a high-pass filter or a low-pass filter, to a sound in the specific section within the music piece, and adding reverberations to the sound in the specific section within the music piece at a predetermined delay time in a similar manner to delay or reverb.

The audio data processing unit 130 is configured to process the audio data 111 associated with a section within the music piece in accordance with the operation signal 121 acquired by the operation signal acquiring unit 120. Here, a section at which the processing is to be performed is identified by the time stamp 111T in the audio data 111. For instance, for repeated playing by the scratch operation, the time stamp 111T at the start of the scratch becomes an end point of the section and the time stamp 111T at a point in time distant back from the end point by time corresponding to an operation amount of the scratch becomes a start point of the section. For repeated playing by jump to the Cue point, a predesignated Cue point becomes the start point of the section and the time stamp 111T at a point in time when instructions for jump is provided by operating the operation unit 122 becomes the end point of the section. In these cases, the audio data processing unit 130 is configured to process the audio data 111 such that the section from the above-described start point to the above-described end point is repeatedly played. Meanwhile, for instance, for the filter or the reverberations, a point in time when the operation unit 122 acquires an operation for turning on the filter or the reverberations becomes the start point of the section and a point in time when the operation unit 122 acquires an operation for turning off the filter or the reverberations becomes the end point of the section. The audio data processing unit 130 is configured to apply the filter or add the reverberations to the audio data 111 in the section from the above-described start point to the above-described end point. The audio data processing unit 130 is configured to perform the processing of the audio data 111 as described above in accordance with, for instance, a program and in accordance with a parameter set in advance using the knob, the switch, or the like of the operation unit 122.

The image data generating unit 140 is configured to generate the image data 141, which contains the character image showing the lyrics of the music piece, on the basis of the text-related data 112 acquired by the data acquiring unit 110. Here, the image data 141 may include a plurality of images to be displayed in a chronological order, that is, data for displaying a video. More specifically, for instance, the image data generating unit 140 is configured to generate a character image on the basis of text data contained in the text-related data 112 and generate the image data 141 where the character image and a background image, which change with the progression of the music piece, are combined. Alternatively, the image data generating unit 140 may use image data of text contained in the text-related data 112 as the character image. It should be noted that the background image, that is, image data for displaying an element of an image other than the character image showing the lyrics of the music piece, may be associated with the time stamp 111T in the music piece as, for instance, the text-related data 112 or may not be associated with the time stamp 111T in the music piece. A position, size, and color of the character image in the image may be predesignated by, for instance, the text-related data 112 or may be determined in accordance with a parameter set using the knob, the switch, or the like of the operation unit 122. As described later, the image data generating unit 140 may be configured to change the position, size, color, etc. of the character image showing the lyrics in the section where the processing of the audio data 111 is performed by the audio data processing unit 130 from those determined in advance in accordance with the type or degree of the processing.

In the exemplary embodiment, the image data generating unit 140 is configured to process the character image contained in the image data 141 on the basis of the time stamp 111T in the music piece associated with the text-related data 112 and the operation signal 121 acquired by the operation signal acquiring unit 120. Specifically, the image data generating unit 140 is configured to process the character image showing the lyrics in the section within the music piece where the audio data 111 is processed by the audio data processing unit 130. For instance, the image data generating unit 140 is configured to copy, in response to acquisition of the operation signal 121 indicating repeatedly playing a specific section within the music piece, the character image in accordance with how many times the section is repeatedly played. In this case, a copied character image may be displayed in a respective different manner. Further, for instance, the image data generating unit 140 may be configured to process, in response to acquisition of the operation signal 121 indicating applying a filter with a predetermined frequency band to a sound in the specific section within the music piece, a region in a height direction of the character image corresponding to the frequency band where the filter is to be applied. In addition, for instance, the image data generating unit 140 may process, in response to acquisition of the operation signal 121 indicating adding the reverberations to the sound in the specific section within the music piece, the character image in accordance with a level of the reverberations or the delay time. It should be noted that other examples of the processing of the character image will be described later.

The data output unit 150 is configured to output audio data 111A processed by the audio data processing unit 130 and the image data 141 generated by the image data generating unit 140. As a result of the data output unit 150 outputting the audio data 111A to an audio output unit 151, such as a speaker or a headphone, connected directly or indirectly to the playing controller 100, the music piece is played. Further, as a result of the data output unit 150 outputting the image data 141 to a display unit 152, such as a display or a projector, connected directly or indirectly to the playing controller 100, the image is displayed. It should be noted that while the operation signal acquiring unit 120 acquires no operation signal indicating an operation for control of the music piece, the audio data processing unit 130 does not process the audio data 111 and the image data generating unit 140 does not process the character image. In this case, the data output unit 150 is configured to output the audio data 111 acquired by the data acquiring unit 110 and the image data 141 containing an unprocessed character image generated by the image data generating unit 140.

Here, as for the image data 141, the image data generating unit 140 may be configured to generate the image data 141 in synchronization with playing of the music piece based on the audio data 111. In this case, in response to the operation signal acquiring unit 120 acquiring an operation signal indicating an operation for control of the music piece, the image data generating unit 140 is configured to generate the image data 141 containing a processed character image from the beginning on the basis of the text-related data 112. Alternatively, the image data generating unit 140 may be configured to generate in advance the image data 141 associated with the time stamp 111T in the music piece on the basis of the text-related data 112. In this case, although the character image is not processed at a point in time when the image data 141 is generated, the image data generating unit 140 is configured to process the character image in a target section contained in the image data 141 at a point in time when the operation signal acquiring unit 120 acquires an operation signal indicating an operation for control of the music piece.

Figure 2:
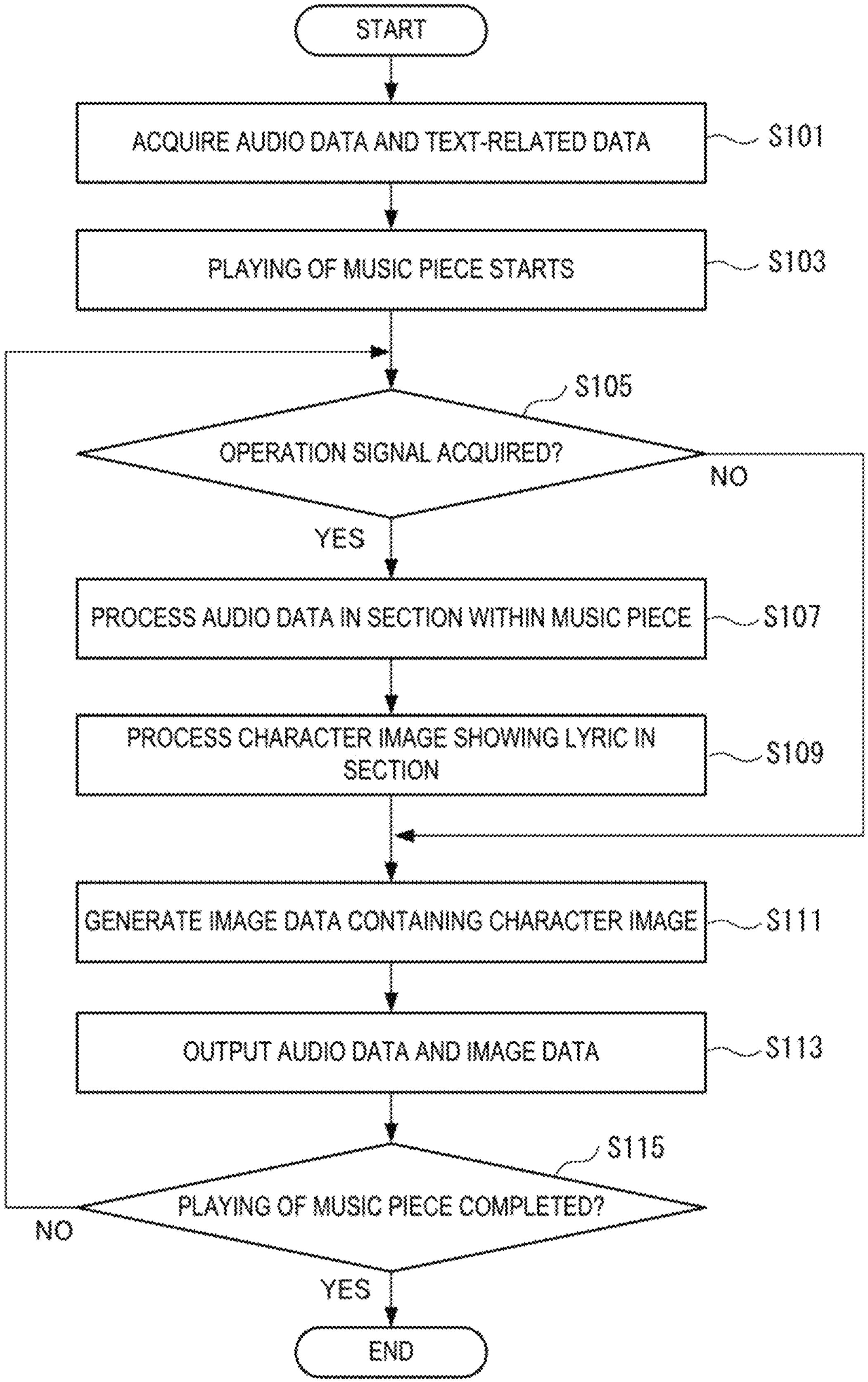
FIG. 2 is a flowchart showing a playing control method according to the exemplary embodiment of the invention.

FIG. 2 is a flowchart showing a playing control method according to the exemplary embodiment of the invention. In an example shown in FIG. 2, the data acquiring unit 110 first acquires the audio data 111 and the text-related data 112 (Step S101). More specifically, for instance, in response to a music piece to be played being determined by operating the operation unit 122, the data acquiring unit 110 reads or receives the audio data 111 and text-related data 112 of the music piece. The data acquiring unit 110 may acquire the audio data 111 and text-related data 112 of the entire music piece all together or may partially acquire the audio data 111 and text-related data 112 in sequence with playing of the music piece.

When playing of the music piece is started (Step S103), the operation signal acquiring unit 120 waits for the operation signal 121 indicating an operation for control of the music piece. In response to the operation signal 121 being acquired (YES in Step S105), the audio data processing unit 130 processes the audio data 111 in a section within the music piece in accordance with the operation signal 121 (Step S107). The image data generating unit 140 also processes a character image showing the lyrics in the section where the audio data 111 is being processed (Step S109) and generates the image data 141 containing the character image (Step S111). It should be noted that the processing of the audio data 111 (Step S107) and the generation of the image data 141 containing the character image (Steps S109 and S111) may be performed temporally in parallel.

During playing of the music piece, the data output unit 150 outputs the audio data 111 (the processed audio data 111A) and the image data 141 containing the character image (Step S113). It should be noted that in a case where no operation signal 121 indicating an operation for control of the music piece is acquired (NO in Step S105), the data output unit 150 outputs the unprocessed audio data 111 and the image data 141 containing an unprocessed character image in Step S113. The above-described processing is repeated at predetermined time intervals until the playing of the music piece is completed (Step S115).

In the exemplary embodiment of the invention described above, a user operates the operation unit 122 during playing of a music piece, thereby not only causing the audio data 111 to be processed by the audio data processing unit 130 but also causing, within an image generated by the image data generating unit 140, a character image showing the lyrics in a section where the audio data 111 is being processed to be processed. By means of such processing, the image to be played with the music piece can be added with a rendering effect that sufficiently expresses, for instance, a real-time feeling of the performance of a DJ (Disc Jockey) or a VJ (Visual Jockey).

Specific Examples of Processing of Character Image

Figure 3:
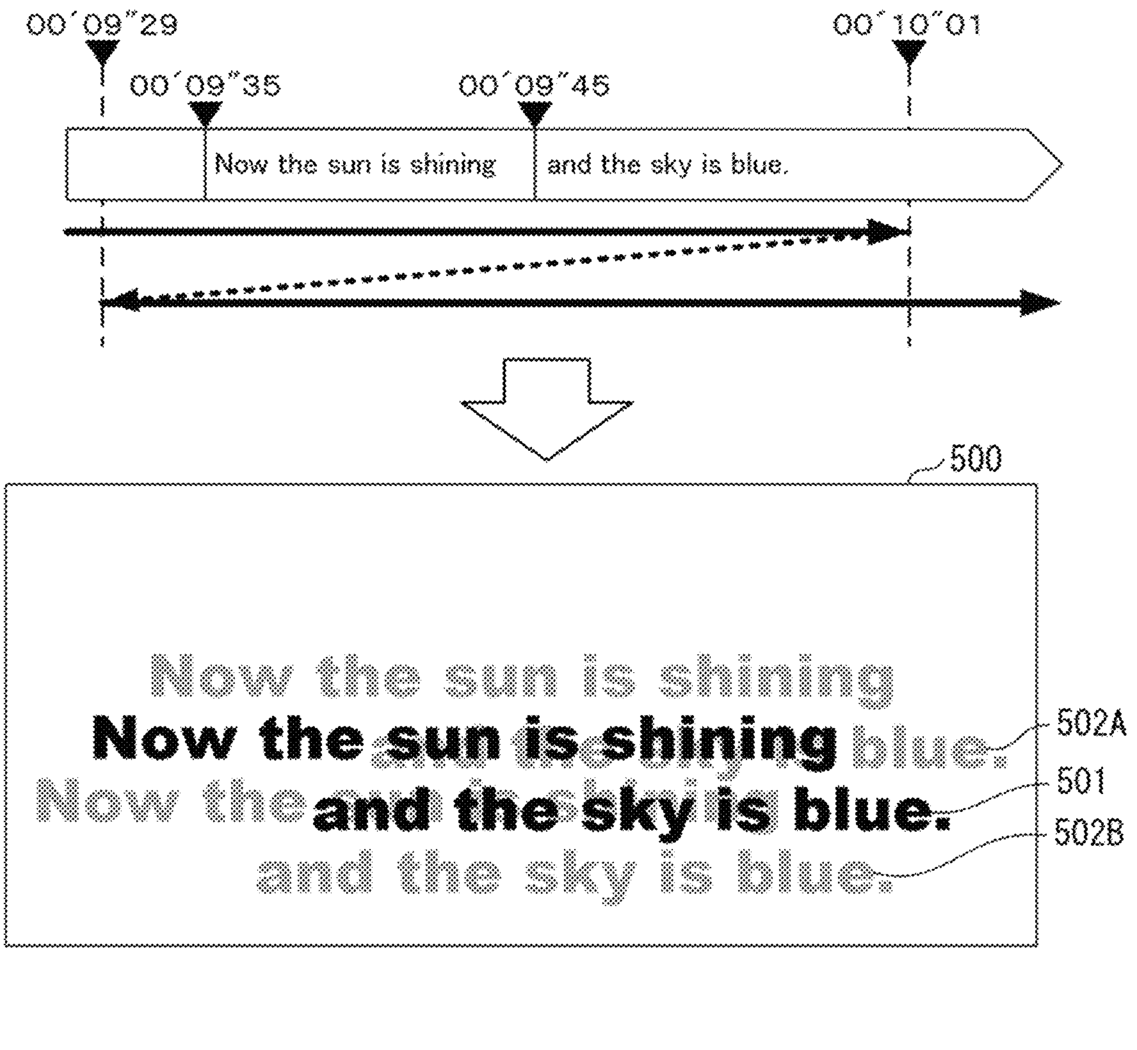
FIG. 3 shows a first example of an image to be displayed in the exemplary embodiment of the invention.

FIG. 3 shows a first example of an image to be displayed in the exemplary embodiment of the invention. In the shown example, the operation signal acquiring unit 120 acquires scratch or an operation for jump to the Cue point at a time stamp “00'10"01” in a music piece and, accordingly, a play position is moved back to a time stamp “00'09"29.” In this case, the audio data processing unit 130 processes the audio data 111 such that a section from the time stamps “00'09"29” to “00'10"01”, which has already been played once, is repeatedly played (a second round of playing). Here, in the text-related data 112, a lyric of “Now the sun is shining” is associated with a time stamp “00'09"35” and a lyric of “and the sky is blue.” is associated with a time stamp “00'09"45.” The image data generating unit 140, which has already generated the image data 141 containing a character image showing the above-described lyrics during a first round of playing, newly generates another image data 141 containing a character image showing the above-described lyrics during the second round of playing with the character image displayed during the first round of playing remaining.

Here, in the example shown in FIG. 3, an image 500 includes a character image 501, which is displayed during the first round of playing, and character images 502A and 502B, which are displayed during the second round of playing. In this example, the image data generating unit 140 is set to create two pairs of copied character images for each time of repeated playing. In a case where a third round of playing of the same section is performed in response to further scratch or operation for jump to the Cue point, another two pairs of copied character images may be created or, for the third and subsequent rounds of playing, another single pair of copied character images may be created for each time of repeated playing. Copied character images 502A and 502B are displayed with a position offset from the original character image 501 as shown. Further, the copied character images 502A and 502B may be displayed in a different size and/or color from the original character image 501.

Figure 4:
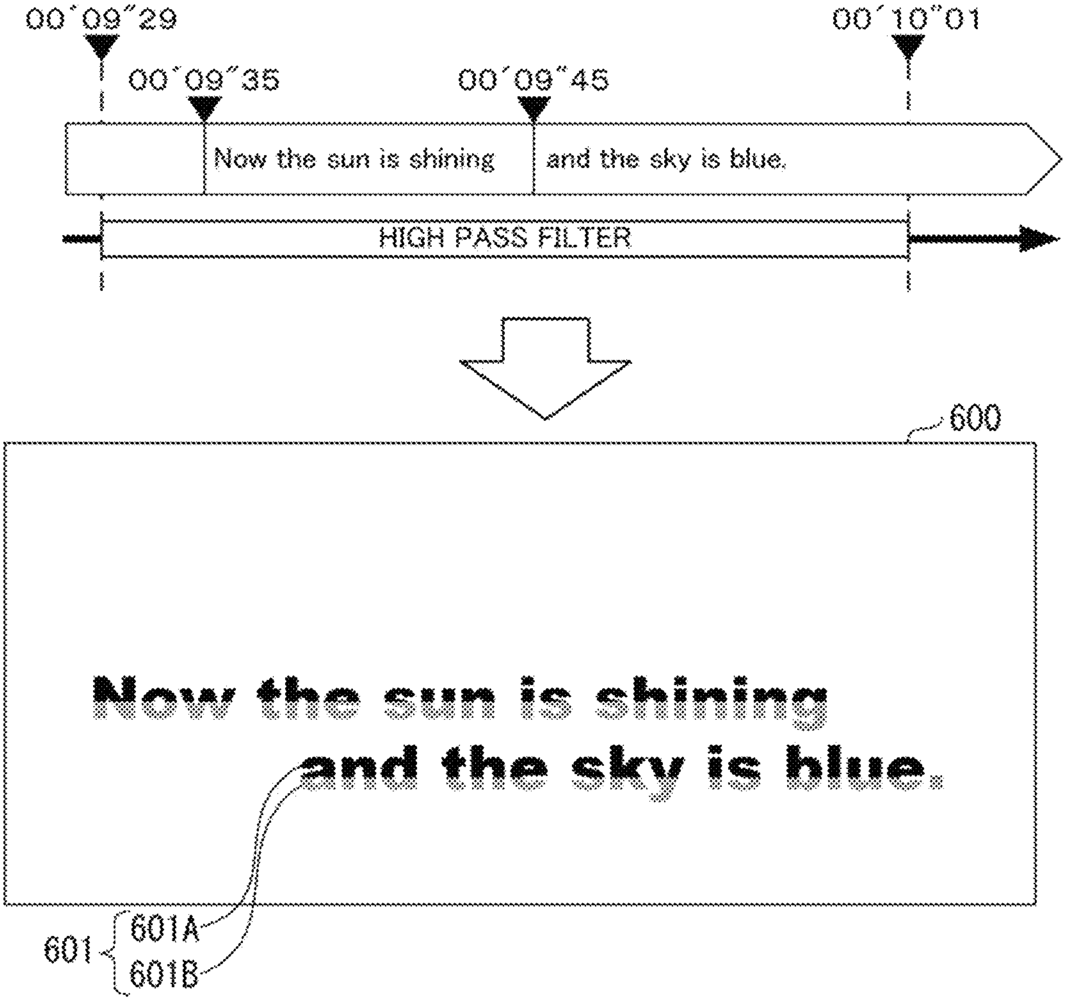
FIG. 4 shows a second example of the image to be displayed in the exemplary embodiment of the invention.

FIG. 4 shows a second example of the image to be displayed in the exemplary embodiment of the invention. In the shown example, the operation signal acquiring unit 120 acquires the operation signal 121 for turning on a high-pass filter at the time stamp "00'09"29" in a music piece and acquires the operation signal 121 for turning off the high-pass filter at the time stamp "00'10"01." In this case, the audio data processing unit 130 applies the high-pass filter to a sound of the music piece in a section from the time stamps "00'09"29" to "00'10"01." The lyrics associated with the time stamps in the text-related data 112 are the same as in the example in FIG. 3. As for the lyrics contained in the above-described section where the audio data 111 is processed through the high-pass filter, that is, "Now the sun is shining" and "and the sky is blue.", the image data generating unit 140 causes an upper region 601A of a character image 601 to be displayed in a dark color and a lower region 601B thereof to be displayed in a light color as in an image 600 in the example shown in FIG. 4.

In another example, the image data generating unit 140 may achieve a gradation in the character image 601 such that an upper side is darker and a lower side is lighter. The image data generating unit 140 may make the lower region 601B transparent (invisible). Alternatively, the image data generating unit 140 may, in addition to changing colors or in place of changing colors, change sizes of the upper region 601A and the lower region 601B of the character image 601 from each other, causing the upper region 601A to be displayed larger and the lower region 601B to be displayed smaller. In these cases, the image data generating unit 140 processes a region in a height direction of the character image 601 corresponding to the frequency band of the filter, which is specifically the upper region 601A corresponding to a high frequency band that is let through the high-pass filter or the lower region 601B corresponding to a low frequency band cut by the high-pass filter.

Figure 5:
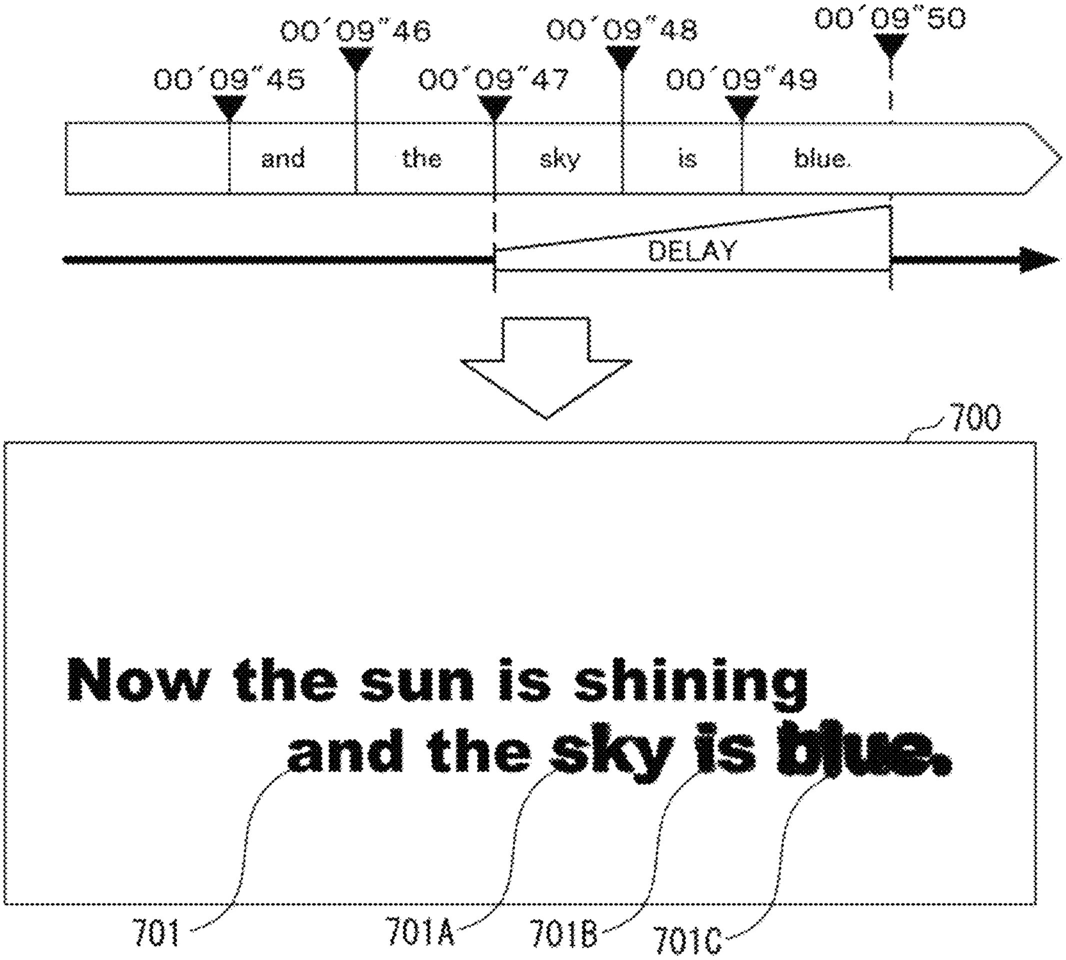
FIG. 5 shows a third example of the image to be displayed in the exemplary embodiment of the invention.

FIG. 5 shows a third example of the image to be displayed in the exemplary embodiment of the invention. In the shown example, the operation signal acquiring unit 120 acquires the operation signal 121 for turning on delay at a time stamp "00'09"47" in a music piece and acquires the operation signal 121 for turning off the delay at a time stamp "00'09"50." Alternatively, the audio data processing unit 130, which is set to set a delay duration at three seconds, acquires the operation signal 121 for causing the operation signal acquiring unit 120 to perform delay at the time stamp "00'09"47" in the music piece. In these cases, the audio data processing unit 130 adds reverberations to a sound of the music piece in a section from the time stamps "00'09"47" to "00'09"50" during the predetermined duration. Here, in the text-related data 112, the lyrics are associated with the time stamps on a word basis unlike in the above-described examples in FIG. 3 and FIG. 4. It means that the words "sky", "is", and "blue" are associated with the section from the time stamps "00'09"47" to "00'09"50." As for these words in the lyrics, the image data generating unit 140 performs processing to blur an outline of a character image 701 as in an image 700 in the example shown in FIG. 5.

In addition, in the shown example, an operation of raising a level of the reverberations of delay (for instance, an operation of turning the knob of the operation unit 122) is further performed after the operation for turning on delay. As a result of the audio data processing unit 130 gradually raising the level of the reverberations in accordance with the operation signals 121 provided by these operations, the level of the reverberations is minimized at the lyric "sky", slightly increased at "is", and further increased at "blue." Accordingly, the image data generating unit 140 slightly blurs an outline of a character image 701A showing the lyric "sky", moderately blurs an outline of a character image 701B showing "is", and greatly blurs an outline of a character image 701C showing "blue" within the character image 701. In this manner, the image data generating unit 140 may determine the degree of the processing of the character image in accordance with the level of the reverberations of delay or reverb or a length of the delay time. Likewise, in other types of processing of the audio data 111, the image data generating unit 140 may determine the degree of the processing of the character image in accordance with the degree of the processing of the audio data 111.

The detailed description is made above on the preferred exemplary embodiment of the invention with reference to the attached drawings; however, the invention is not limited to such an example. It is obvious that a person having common knowledge in the art to which the invention pertains should come to a variety of modifications or alterations within the scope of the technical idea according to claims and it should be understood that these modifications or alterations are also, of course, within the technical scope of the invention.

The invention claimed is:

1. A playing controller comprising:

a data acquiring unit configured to acquire audio data associated with information regarding a play position in a music piece and text-related data associated with the information regarding the play position;

an operation signal acquiring unit configured to acquire an operation signal indicating an operation for a control of the music piece following start of playing of the music piece, the operation signal being generated by a user operating an operation unit while the music piece is played;

an audio data processing unit configured to process, in accordance with the operation signal acquired following start of playing of the music piece, the audio data associated with a section within the music piece, the section being identified by the information regarding the play position;

an image data generating unit configured to generate image data comprising a character image based on the text-related data and process the character image showing a lyric in the section based on the information regarding the play position and the operation signal acquired following start of playing of the music piece; and a data output unit configured to output the processed audio data and the image data, wherein at least one of a start point of the section or an end point of the section is identified in accordance with the operation signal acquired following start of playing of the music piece.

2. The playing controller according to claim 1, wherein the operation comprises repeatedly playing the section, and the image data generating unit is configured to copy the character image in accordance with how many times the section is repeatedly played.

3. The playing controller according to claim 2, wherein the copied character image is displayed in a respective different manner.

4. The playing controller according to claim 1, wherein the operation comprises applying a filter with a predetermined frequency band to a sound in the section, and the image data generating unit is configured to process a region in a height direction of the character image corresponding to the predetermined frequency band.

5. The playing controller according to claim 1, wherein the operation comprises adding reverberations to a sound in the section at a predetermined delay time, and the image data generating unit is configured to determine a degree of processing of the character image in accordance with a level of the reverberations or a length of the delay time.

6. A non-transitory computer-readable recording medium recording a program configured to cause a computer to function as the playing controller according to claim 1.

7. The playing controller according to claim 1, wherein the operation comprises a first operation and a second operation different from the first operation, and the image data generating unit is configured to perform a first process of the character image when the operation signal of the first operation is acquired and to perform a second process of the character image different from the first process when the operation signal of the second operation is acquired.

8. A playing control method comprising:

acquiring audio data associated with information regarding a play position in a music piece and text-related data associated with the information regarding the play position;

acquiring an operation signal indicating an operation for a control of the music piece following start of playing of the music piece, wherein the operation signal is generated by a user operating an operation unit while the music piece is played;

processing, in accordance with the operation signal acquired following start of playing of the music piece, the audio data associated with a section within the music piece, the section being identified by the information regarding the play position;

generating image data comprising a character image based on the text-related data and processing the character image showing a lyric in the section based on the information regarding the play position and the operation signal acquired following start of playing of the music piece; and outputting the processed audio data and the image data, wherein at least one of a start point of the section or an end point of the section is identified in accordance with the operation signal acquired following start of playing of the music piece.

9. The playing control method according to claim 8, wherein the operation comprises repeatedly playing the section, and generating the image data includes copying the character image in accordance with how many times the section is repeatedly played.

10. The playing control method according to claim 9, wherein, in outputting the processed audio data and the image data, the copied character image is displayed in a respective different manner.

11. The playing control method according to claim 8, wherein the operation comprises applying a filter with a predetermined frequency band to a sound in the section, and generating the image data includes processing a region in a height direction of the character image corresponding to the predetermined frequency band.

12. The playing control method according to claim 8, wherein the operation comprises adding reverberations to a sound in the section at a predetermined delay time, and generating the image data includes determining a degree of processing of the character image in accordance with a level of the reverberations or a length of the delay time.

13. The playing control method according to claim 8, wherein the operation comprises a first operation and a second operation different from the first operation, and generating the image data includes performing a first process of the character image when the operation signal of the first operation is acquired and performing a second process of the character image different from the first process when the operation signal of the second operation is acquired.

* * * * *